(12) United States Patent
Snow

(10) Patent No.: US 7,020,995 B1
(45) Date of Patent: Apr. 4, 2006

(54) DETERRENT STRIP FOR REPELLING BIRDS AND OTHER PESTS

(76) Inventor: Roger Snow, 298 Belvedere Ave., Belvedere, CA (US) 94920

( * ) Notice: Subject to any disclaimer, the term of this patent is extended or adjusted under 35 U.S.C. 154(b) by 117 days.

(21) Appl. No.: 10/844,688

(22) Filed: May 13, 2004

Related U.S. Application Data

(63) Continuation-in-part of application No. 10/781,952, filed on Feb. 19, 2004, now Pat. No. 6,928,768.

(51) Int. Cl.
*A01K 3/00* (2006.01)

(52) U.S. Cl. ............................. 43/98; 52/101
(58) Field of Classification Search ............... 43/98, 43/112; 52/101; 256/10, 19, 24
See application file for complete search history.

(56) References Cited

U.S. PATENT DOCUMENTS

| | | | |
|---|---|---|---|
| 2,626,303 A | | 1/1953 | Link |
| 3,294,893 A | * | 12/1966 | Shaffer ...................... 174/70 R |
| 3,366,854 A | * | 1/1968 | Robinson ..................... 361/232 |
| 3,717,802 A | | 2/1973 | Plevy et al. |
| 4,262,169 A | * | 4/1981 | Lanton, Jr. ................... 174/136 |
| 4,299,048 A | * | 11/1981 | Bayes ............................ 43/98 |
| 4,471,561 A | * | 9/1984 | Lapierre ....................... 43/108 |
| 4,533,120 A | * | 8/1985 | Ruddock ...................... 256/52 |
| 4,706,941 A | | 11/1987 | Sherdan |
| 4,747,229 A | * | 5/1988 | Chambers ..................... 43/112 |
| 4,862,637 A | * | 9/1989 | Dressel ......................... 43/98 |
| 5,031,353 A | * | 7/1991 | Gardiner ........................ 43/98 |
| 5,095,646 A | * | 3/1992 | Bunkers ......................... 43/98 |
| 5,096,162 A | | 3/1992 | Cleveland |
| 5,163,658 A | * | 11/1992 | Cleveland .................... 256/10 |
| 5,255,896 A | * | 10/1993 | Letarte et al. ................ 256/10 |
| 5,570,537 A | * | 11/1996 | Black et al. ................... 43/112 |
| 5,850,808 A | * | 12/1998 | Burdick ....................... 119/713 |
| 6,006,698 A | * | 12/1999 | Negre ......................... 119/537 |
| 6,283,064 B1 | * | 9/2001 | Djukastein et al. ......... 119/713 |
| 6,383,064 B1 | | 5/2002 | Eggert et al. |
| 6,450,483 B1 | * | 9/2002 | Baum .......................... 256/10 |

* cited by examiner

*Primary Examiner*—Peter M. Poon
*Assistant Examiner*—Bethany L. Griles
(74) *Attorney, Agent, or Firm*—Thomas R. Lampe

(57) ABSTRACT

A deterrent strip for repelling birds and other pests includes two electrical wire support members separated by spaces extending across the strip to allow bending. Connectors are attached to the wire support members to resist lengthwise stretching of the strip, the connectors extending across the spaces and offset from the center of the strip.

10 Claims, 2 Drawing Sheets

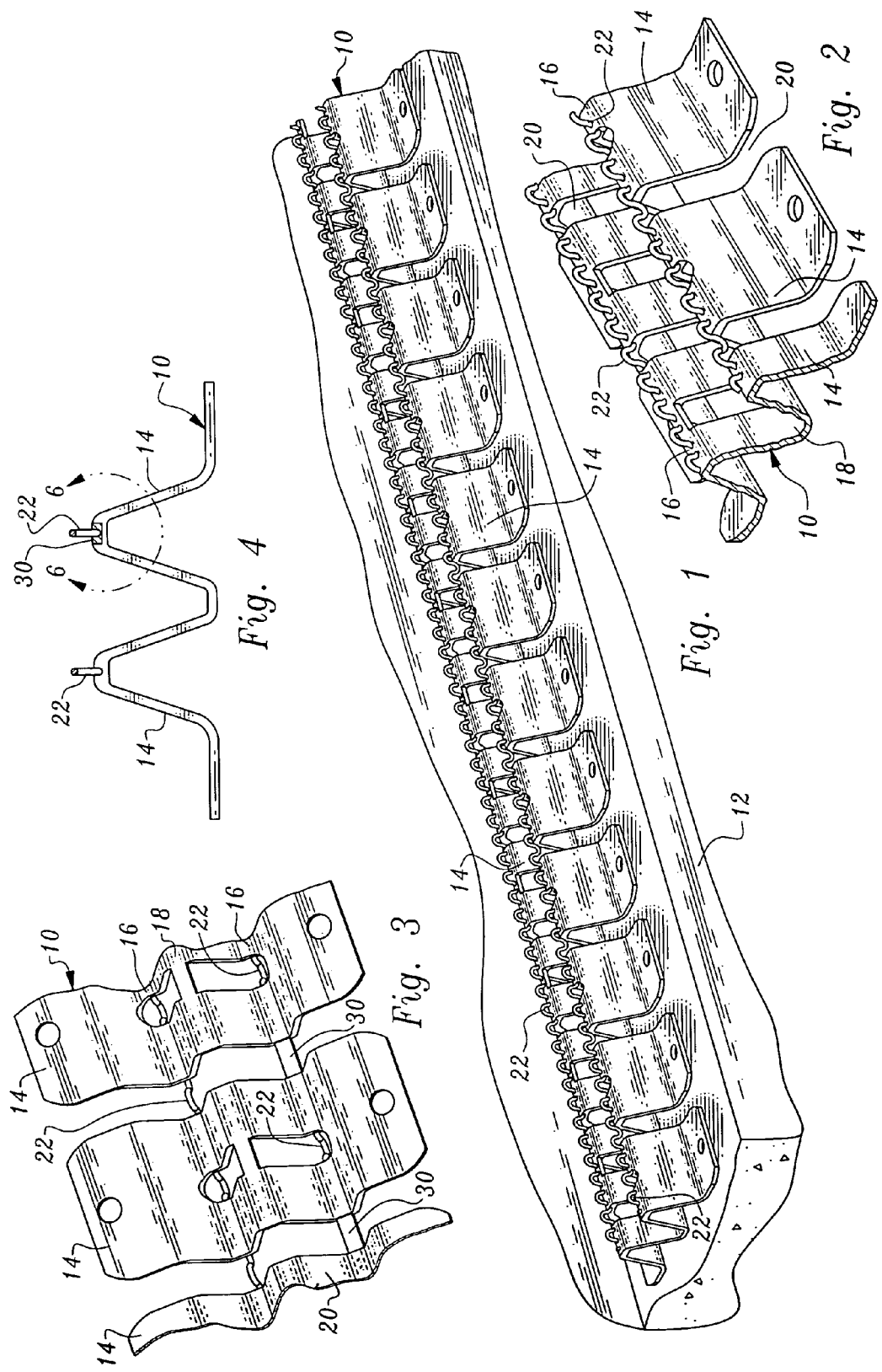

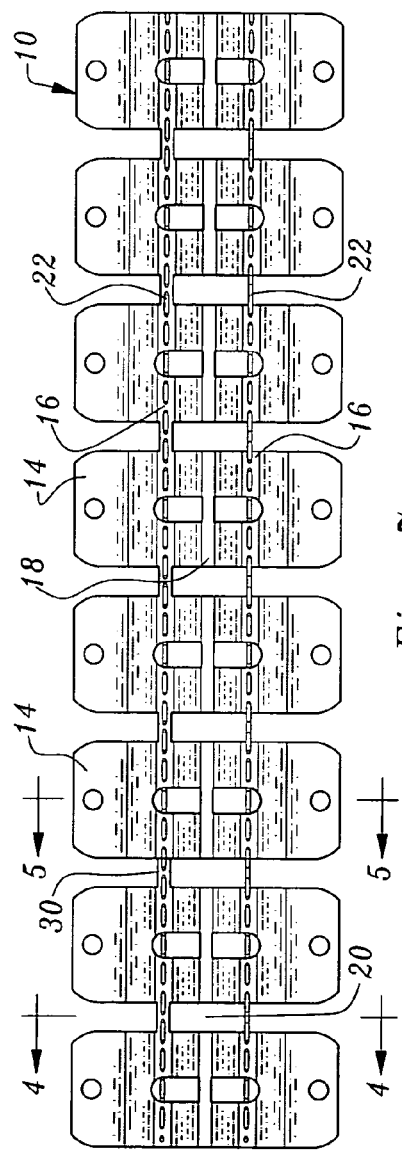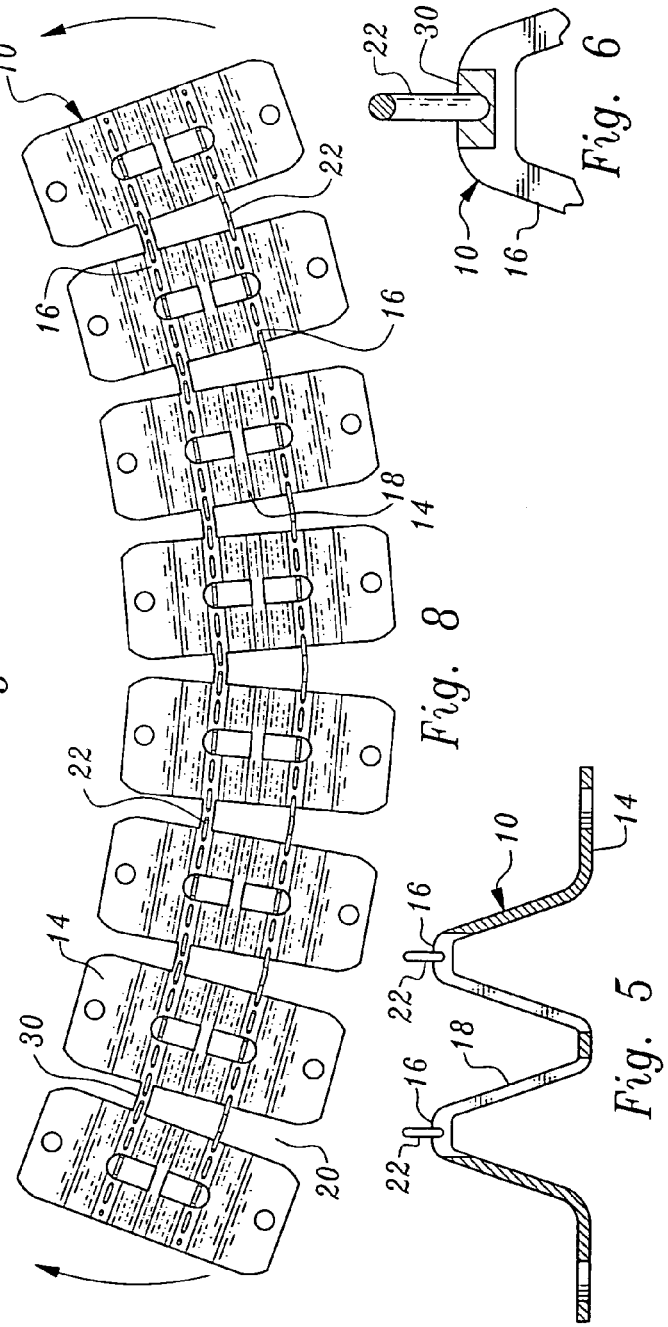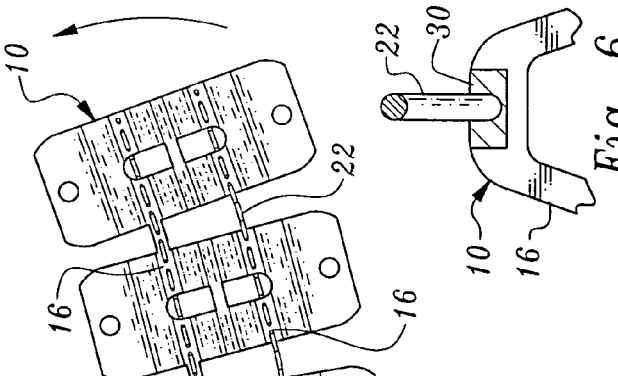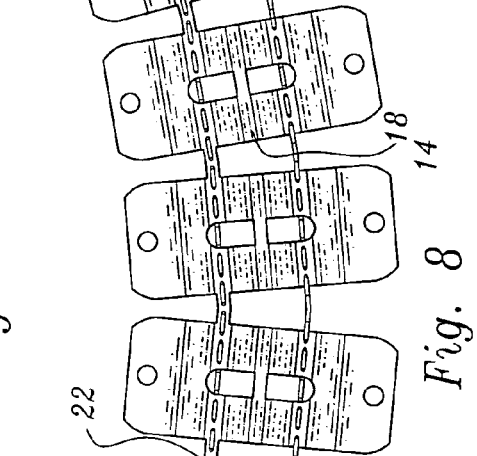

DETERRENT STRIP FOR REPELLING BIRDS AND OTHER PESTS

This application is a continuation-in-part of my U.S. patent application Ser. No. 10/781,952, filed Feb. 19, 2004 now U.S. Pat. No. 6,928,768.

TECHNICAL FIELD

This invention relates to a pest repelling device, and more particularly to a strip which may be secured to buildings, statues or other objects to discourage birds and other pests from resting thereon.

BACKGROUND OF THE INVENTION

U.S. Pat. No. 6,383,064, issued Sep. 4, 2001, discloses a pest repelling device co-invented by the inventor of the present invention.

The device of U.S. Pat. No. 6,383,064 relates to an elongated deterrent strip for mounting to an inanimate object to discourage birds and other pests from resting on that object. The strip includes a base of electrically non-conductive material. The strip in lateral cross-section has peripheral edges normally lying in a plane and a raised concave center portion. The base has spaced notches along each edge to provide flexibility to the base, whereby the base may be bent both out of the plane and within the plane. The strip further comprises two electrically conductive wires secured to and extending over the upper surface of the base, over the notches. The wires are spaced so that a bird's feet will contact both wires when on the base. The wires are connectable to an energy source so that the animal's feet will short the wires when perched on the strip, giving a mild shock to the animal to discourage it from continuing its perch on the strip.

In the device of U.S. Pat. No. 6,383,064, the wires are crimped in undulating fashion along the length of the base. One problem resulting from this prior art approach is that strong winds can cause the strip to flap up and down. This causes lengthwise stretching of the strip, including the undulating wires, and the end result is that the product either bends upwardly into an arch or in certain circumstances stretches so far that it sags over the edge of the building or other support surface on which it is mounted. In an attempt to solve the problem the strip has been attached to its support surface along the length thereof at very short intervals, e.g., 12 inches. However, even this does not eliminate the stretching problem.

Other devices are known in the prior art for carrying electric charges for discouraging birds and other pests. Exemplary of the state of the prior art are the devices shown in the following: U.S. Pat. No. 5,850,808, issued Dec. 22, 1998, U.S. Pat. No. 3,294,893, issued Dec. 27, 1966, U.S. Pat. No. 3,717,802, issued Feb. 20, 1973, U.S. Pat. No. 3,366,854, issued Jan. 30, 1968, U.S. Pat. No. 4,299,048, issued Nov. 10, 1981, U.S. Pat. No. 4,706,941, issued Nov. 17, 1987, U.S. Pat. No. 5,163,658, issued Nov. 17, 1992, U.S. Pat. No. 5,096,162, issued Mar. 17, 1992 and U.S. Pat. No. 2,626,303, issued Jan. 20, 1953.

The prior art indicated above does not teach or suggest the invention disclosed and claimed herein.

The invention disclosed in my co-pending U.S. patent application Ser. No. 10/781,952, filed Feb. 19, 2004, relates to a deterrent strip for repelling birds and other pests. The strip includes a plurality of wire support members of electrically non-conductive material forming a bendable base. Each wire support member includes two spaced wire support portions and an inner portion disposed between and interconnecting the spaced wire support portions. The inner portions of adjacent wire support members define spaces therebetween.

The deterrent strip also includes two electrically conductive, extensible wires disposed along at least a portion of the length of the base. The electrically conductive, extensible wires are secured to the spaced wire support portions and spaced from one another.

Restraint members are attached to and extend between the inner portions of adjacent wire support members across the spaces defined thereby, resisting lengthwise stretching of the strip. More particularly, the device disclosed in U.S. patent application Ser. No. 10/781,952 discloses an arrangement wherein the restraint members extend along the center of the strip mid-way between the electrically conductive extensible wires.

DISCLOSURE OF INVENTION

While the device disclosed in my above-referenced application is highly effective for its intended purpose, it has been found that the placement of the restraint members in the strip center at the strip bottom makes it difficult to roll up the strip and form a compact roll suitable for example for storage and transport.

The present invention relates to a deterrent strip for repelling birds and other pests. The structure of the strip is such that it can readily roll up when not in use, for example for storage or transport. The strip includes a plurality of wire support members of electrically non-conductive material forming a bendable base. Each wire support member includes two spaced wire support portions and an inner portion disposed between and interconnecting the spaced wire support portions. The spaced wire support portions are elevated relative to the inner portions. Adjacent wire support members define spaces therebetween.

The deterrent strip also includes a plurality of electrically conductive, extensible wires disposed along the base. The electrically conductive, extensible wires are secured to the spaced wire support portions and are spaced from one another.

Restraint members are attached to and extend between adjacent wire support members across the space defined thereby, resisting lengthwise stretching of the strip. The restraint members are in substantial alignment and disposed off to one side of the inner portions.

Other features, advantages and objects of the present invention will become apparent with reference to the following description and accompanying drawings.

BRIEF DESCRIPTION OF DRAWINGS

FIG. 1 is a perspective view of a portion of a strip constructed in accordance with the teachings of the present invention mounted on a support surface;

FIG. 2 is an elongated, top, perspective view illustrating details of a segment of the strip;

FIG. 3 is an enlarged, bottom, perspective view of a strip segment;

FIG. 4 is a cross-sectional, enlarged view of a segment of the strip taken along line 4—4 in FIG. 7;

FIG. 5 is a cross-sectional, enlarged view taken along line 5—5 in FIG. 7;

FIG. 6 is an enlarged, cross-sectional view of a portion of the strip taken along line 6—6 of FIG. 4;

FIG. 7 is a top, plan view of the strip in straight configuration; and

FIG. 8 is a view similar to FIG. 7, but illustrating the strip in bent condition.

BEST MODE FOR CARRYING OUT THE INVENTION

Referring now to FIGS. 1–8, a strip 10 constructed in accordance with the teachings of the present invention is illustrated. The strip 10 is a deterrent strip for repelling birds and other pests. In FIG. 1, a length of the strip 10 is shown mounted on the ledge 12 of a building, a typical but not exclusive setting for use of the strip.

The strip includes a flexible, bendable base which is comprised of a plurality of wire support members 14 of electrically non-conductive material, for example plastic. Each wire support member includes two spaced wire support portions 16 and an inner portion 18. The wire support portions are elevated relative to the inner portion. Adjacent wire support members define spaces 20 therebetween extending the full width of the strip. The spaces provide flexibility to the base whereby it may be bent both out of plane and within plane.

Strip 10 also includes two electrically conductive wires 22 which are crimped so that they are somewhat extensible to enable the strip to be bent as desired to conform to the shape of the support to which it is secured. This is accomplished by forming the wires so that they undulate lengthwise. The wires may be embedded into the wire support members or secured thereto in some other fashion. When the strip is bent, the undulating configuration of the wires provides them with a certain amount of give so that they will not disassociate from the base when it is bent or when the wires and base expand or contract at a different rate. The spacing between the wires is such that they can be simultaneously engaged by a pest, such as by the feet of a bird. The wires are connected to a source of electrical energy (not shown) and impart a mild shock to the animal so that it moves away from the strip.

The structure described above is subject to undesirable lengthwise stretching after installation.

To solve the problem of stretching, in the present invention restraint members are attached to and extend between adjacent wire support members across the spaces 20 defined thereby to resist lengthwise stretching of the strip. More particularly, the restraint members are in the form of flexible, readily bendable, substantially non-linearly extensible thin strips or connectors 30. In the disclosed embodiment, the connectors 30 are integral with the wire support members and the connectors and the wire support members are of a single, unitary molded plastic construction. The nature of the connectors 30 is such that they enable the strip to be bent while exerting forces on the wire support members thereof which limit lengthwise stretching of the strip. FIG. 8 shows the strip in a bent, in plane configuration, employed for example when the strip is mounted on a corner of building or other structure. The strip may also be readily bent out of plane.

The connectors are in alignment, extending between the tops or upper portions of wire support portions 16 and spaced from and disposed off to one side of the inner portion 18. The connectors run parallel to and are disposed under one of the electrically conductive wires 22.

Utilizing the approach just described, the strip may readily be rolled up during non-use, for example for storage and transport.

The invention claimed is:

1. A deterrent strip for repelling birds and other pests, said strip comprising, in combination:
   a plurality of wire support members of electrically non-conductive material forming a flexible, bendable base, each wire support member including two spaced wire support portions and an inner portion disposed between and interconnecting the spaced wire support portions, the spaced wire support portions being elevated relative to said inner portions, adjacent wire support members defining spaces therebetween;
   a plurality of electrically conductive, extensible wires disposed along said base, said electrically conductive, extensible wires secured to said spaced wire support portions and spaced from one another; and
   restraint members attached to and extending between adjacent wire support portions of said plurality of wire support members across the spaces defined thereby resisting lengthwise stretching of said strip, said restraint members being in substantial alignment and spaced from and disposed off to one side of said inner portions.

2. The strip according to claim 1 wherein the spaces defined by adjacent wire support members extend completely across said strip.

3. The strip according to claim 1 wherein said restraint members extend between uppermost segments of adjacent wire support portions.

4. The strip according to claim 3 wherein said restraint members are under one of said electrically conductive, extensible wires.

5. The strip according to claim 1 wherein said restraint members are disposed below the level of said electrically conductive extensible wires.

6. The strip according to claim 1 wherein said electrically conductive wires are spaced so that a bird or other pest can simultaneously contact said electrically conductive wires when engaging the strip to short said electrically conductive wires and provide a mild shock to the pest.

7. The strip according to claim 1 wherein said restraint members comprise flexible, readily bendable, substantially non-linearly extensible connectors.

8. The apparatus according to claim 7 wherein said connectors are integral with said wire support members.

9. The strip according to claim 8 wherein said connectors and said wire support members are of molded plastic construction.

10. A deterrent strip for repelling birds and other pests, said strip comprising, in combination:
    a plurality of wire support members of electrically non-conductive material forming a flexible, bendable base, each wire support member including two spaced wire support portions and an inner portion disposed between and interconnecting the spaced wire support portions, the spaced wire support portions being elevated relative to said inner portions, adjacent wire support members defining spaces therebetween extending completely across said strip;
    a plurality of electrically conductive, extensible wires disposed along said base, said electrically conductive, extensible wires secured to said spaced wire support portions and spaced from one another; and
    restraint members attached to and extending between adjacent wire support portions of said plurality of wire support members across the spaces defined thereby resisting lengthwise stretching of said strip, said restraint members being spaced from said inner portions and only one restraint member extending between adjacent wire support members.

* * * * *